US010676987B2

(12) United States Patent
Hall et al.

(10) Patent No.: US 10,676,987 B2
(45) Date of Patent: Jun. 9, 2020

(54) SUNRISE INFLUENCED WINDOW SHADE ALARM CLOCK (71) Applicants: David R. Hall, Provo, UT (US); Emily Brimhall, Alpine, UT (US); Joe Fox, Spanish Fork, UT (US)

(72) Inventors: David R. Hall, Provo, UT (US); Emily Brimhall, Alpine, UT (US); Joe Fox, Spanish Fork, UT (US)

(73) Assignee: Hull Labs LLC, Provo, UT (US)

( * ) Notice: Subject to any disclaimer, the term of this patent is extended or adjusted under 35 U.S.C. 154(b) by 189 days.

(21) Appl. No.: 15/621,440

(22) Filed: Jun. 13, 2017

(65) Prior Publication Data
US 2018/0355663 A1 Dec. 13, 2018

(51) Int. Cl.
| | |
|---|---|
| *E06B 9/322* | (2006.01) |
| *E06B 9/68* | (2006.01) |
| *G04C 23/16* | (2006.01) |
| *E06B 9/32* | (2006.01) |
| *G04B 15/00* | (2006.01) |
| *E06B 9/38* | (2006.01) |
| *G04G 11/00* | (2006.01) |
| *G04G 13/02* | (2006.01) |
| *G08C 17/02* | (2006.01) |
| *G05B 11/01* | (2006.01) |
| *G04G 15/00* | (2006.01) |
| *G04C 23/18* | (2006.01) |
| *G05B 15/02* | (2006.01) |

(52) U.S. Cl.
CPC .............. *E06B 9/322* (2013.01); *E06B 9/32* (2013.01); *E06B 9/38* (2013.01); *E06B 9/68* (2013.01); *G04C 23/16* (2013.01); *G04C 23/18* (2013.01); *G04G 11/00* (2013.01); *G04G 13/02* (2013.01); *G04G 15/003* (2013.01); *G04G 15/006* (2013.01); *G05B 11/01* (2013.01); *G08C 17/02* (2013.01); *E06B 2009/6809* (2013.01); *G05B 15/02* (2013.01); *G05B 2219/2642* (2013.01)

(58) Field of Classification Search
CPC ........... E06B 9/322; E06B 9/38; G08C 17/02; G05B 11/01; G04G 13/02; G04G 11/00
USPC .............................. 368/1, 62, 72, 73, 89, 98
See application file for complete search history.

(56) References Cited

U.S. PATENT DOCUMENTS

| | | | |
|---|---|---|---|
| 2005/0189078 A1* | 9/2005 | Whiting | ..................... E06B 9/32 160/176.1 P |
| 2014/0269222 A1* | 9/2014 | Patton | ..................... G04G 15/00 368/73 |

* cited by examiner

Primary Examiner — Justin V Lewis (57) ABSTRACT

A window shade alarm system for gently awakening a user. The window shade is connected to the Internet and opens such that light gradually increases in a room. Thus waking a user less abruptly than a traditional audio alarm. The window shade stores user selected modes and can control wireless enabled lights within a room to simulate the gradual increase of light at sunrise. The alarm system is connected to remote activated devices for the convenience of the user.

16 Claims, 7 Drawing Sheets

FIG. 7

SUNRISE INFLUENCED WINDOW SHADE ALARM CLOCK

TECHNICAL FIELD

This invention relates generally to the field of consumer electronics and more particularly to alarm clocks.

BACKGROUND

Alarm clocks are ubiquitous. Efforts have been made to improve the basic sound based alarm because many people find the audible alarm annoying. Window shades are also ubiquitous and function well for their intended purpose, keeping the light out of a room. Window shades however, do not open at specific times, they require aid or input.

SUMMARY OF THE INVENTION

In some embodiments, a window shade comprising; a window shade housing, a clock display occupying a portion of the housing facing into a room. A processor within the housing for generating and communicating at least one shade positioning command to a motorized shade mechanism, so as to cause the motorized shade mechanism to move the shade to one or more positions at one or more predetermined intervals relative to alarm time.

In some embodiments, a window shade comprising; a window shade housing, a clock display occupying a portion of the housing facing into a room. The window shade being wireless communication enabled. A processor being housed in the window shade and being able to access the wireless communication. The processor being programmed with several command sequences that contain at least one shade positioning command, to cause the motorized shade mechanism to move the shade to at least one open position. The processor being programmed with command sequences capable of causing the motorized shade mechanism to multiple open positions at predetermined times. A processor being user programmable, via a wireless communication enabled device, to move the motorized shade mechanism to user programmable open positions at user programmable intervals.

In some embodiments a window shade comprising; a window shade housing, a clock display occupying a portion of the housing facing into a room. The window shade being wireless communication enabled transmits a signal to another wireless communication enabled device able to produce sounds that correspond to the predetermined alarm time.

BRIEF DESCRIPTION OF THE DRAWINGS

A more particular description of the thermoforming apparatus summarized above is made below by reference to specific embodiments. Several embodiments are depicted in drawings included with this application, in which:

FIG. 2, including

DETAILED DESCRIPTION

A detailed description of embodiments of a window shade alarm clock is provided below by example, with reference to embodiments in the appended figures. The figures are to be considered part of the written description. In the description relative terms such as "lower," "upper," "horizontal," "vertical," "above," "below," "up," "down," "top," and "bottom" as well as derivatives thereof (e.g. "vertically," "downwardly," etc.) should be construed to refer to the orientation then described or as shown in the drawing under discussion. These relative terms are for convenience and are not requirements for the orientation of the construction or operation of the apparatus. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

This disclosure describes a window shade alarm clock, which allows a user to gradually wake up, instead of being abruptly awakened by a traditional alarm clock. This gradual awakening is accomplished by the gradual opening of the window shade, thus allowing increasing amounts of light in. The user may select the timing of the opening of the window shade to best assist them in waking up in a healthy and helpful way. In some embodiments backup systems are provided to ensure that the user is awakened.

A user controls the window shade alarm by means of a mobile device, which connects to the window shade alarm wirelessly. The mobile device can be a smart phone, tablet, mini-tablet, or any similar device. The mobile device may activate the alarm through a cloud based network.

The mobile device is configured to provide a graphical interface to a user to allow the user to adjust the window shade alarm to the user preferences. The user identifiable options include but are not limited to alarm time, shade positions, shade intervals, when to begin a sunrise event, the addition of a wirelessly connected light to the sunrise event, when to sound an audible alarm relative to alarm time. In some embodiments, the mobile device has stored in its memory an application for inputting the data input parameters used by the window shade alarm 100, The processor— is configured to detect when the mobile device is connected and save the user input choices in the non-transitory memory.

Figure 1:
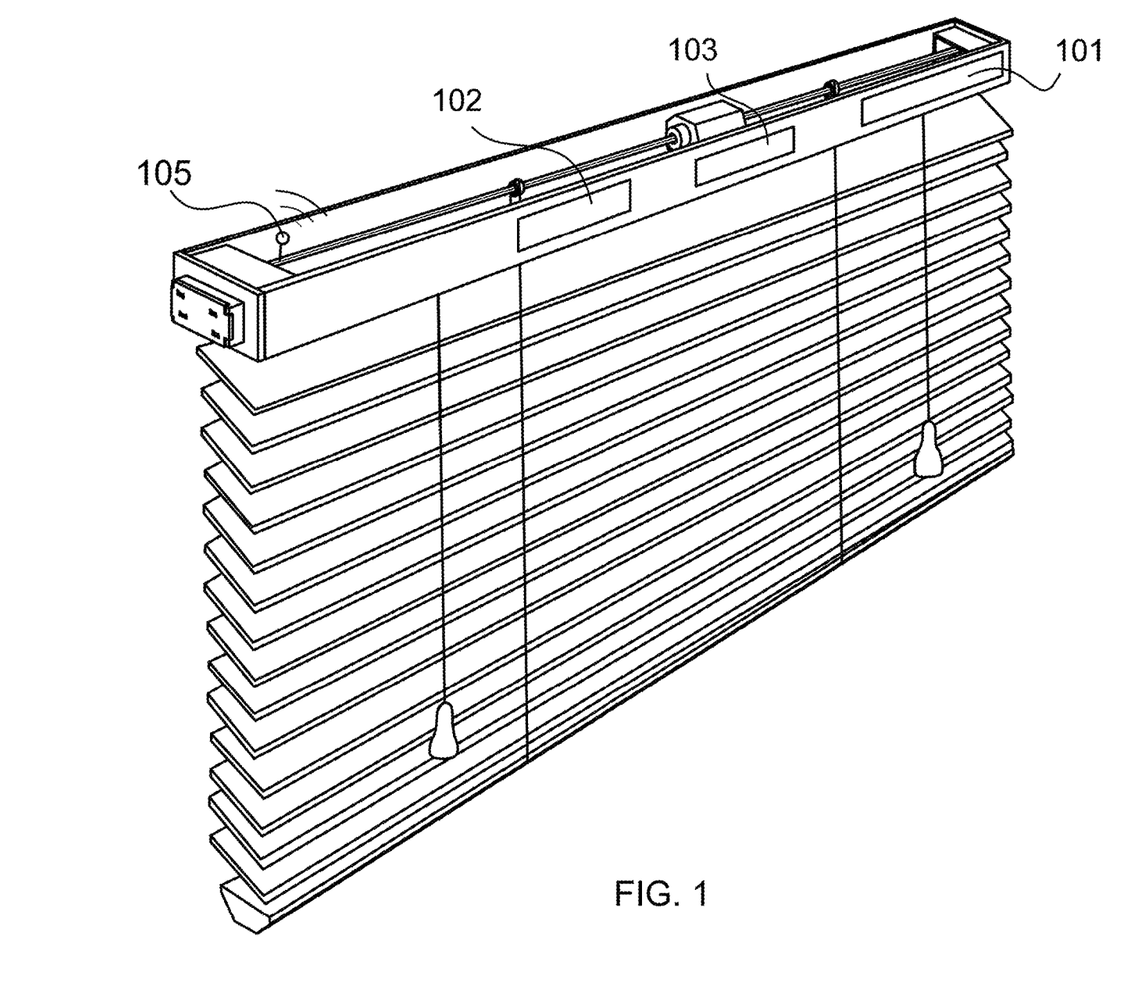
FIG. 1 depicts an isometric view of a window shade alarm system according to one embodiment.

FIG. 1 is an isometric view of a first embodiment of window shade alarm clock 100. The window shade alarm clock 100 comprises a window shade housing a clock display 101 occupying a portion of the housing facing into a room. In some embodiments the clock display 101 can be one of several formats, such as a digital readout, or an analog clock, having actual or simulated clock hands). In other embodiments the clock display can be a projection of a clock display. In still other embodiments the clock display can use various colors and/or various brightness.

The shade 100 has a processor 102 within the shade. The processor 102 causes at least one shade positioning command to be sent to the motorized shade mechanism, to cause the motorized shade mechanism to move to one or more position a one or more corresponding predetermined interval relative to an alarm time.

In some embodiments, the at least one shade positioning command includes a single command to cause the shade to gradually open at a predetermined average rate. For example, when a wake-up event, also called a sunrise event, is set, the shade positioning command can cause the shade to be lifted a constant linear speed for a predetermined period of time, or until the shade reaches a fully open position. In other embodiments, the command can cause the shade to be lifted at an average linear velocity. The processor can accept the period of time as a user input, or use a default period stored in a non-transitory storage medium within the window shade. If the user inputs the period if time, the shade positioning command calculates the period if time and or the average linear speed.

In some embodiments, the processor 102 is configured to generate a command sequence including a plurality of shade positioning commands to be sent to the motorized shade mechanism—to cause the shade to move to respectively different positions, so as to gradually open the shade.

The window shade alarm 100 has a command for turning on an audible alarm via a wireless enabled device that contains a speaker, so as to cause an audible alarm to sound. In some embodiments the alarm control causes the audible alarm to be emitted at the alarm time entered by the user in a conventional manner. In some embodiments, if the alarm command and the sunrise event command are both activated, the action of the audible alarm command is modified. For example in some embodiments, the audible alarm is delayed until passage of a predetermined interval after the alarm time, and the audible alarm does not emit sound if the user turns off the alarm control between the alarm time and the end of the predetermined interval.

In some embodiments a light command is included. If the sunrise event command and the light command are both set, then during the sunrise event, in addition to controlling the shades the window shade alarm issues commands to a wirelessly connected light.

Figure 2:
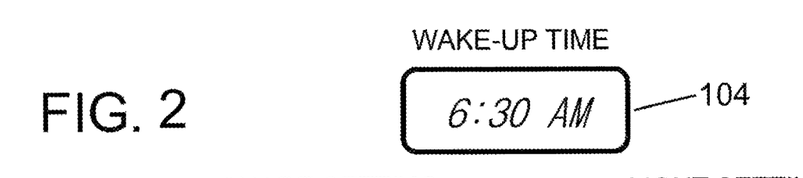
Figures 2A, 2B:
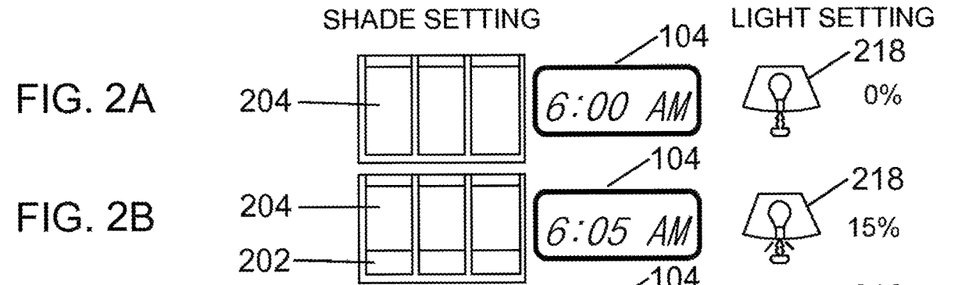
FIGS. 2A-2G, depicts a diagram showing operation of the shade and lights by the window shade alarm at various instants in time.
Figures 2C, 2D:
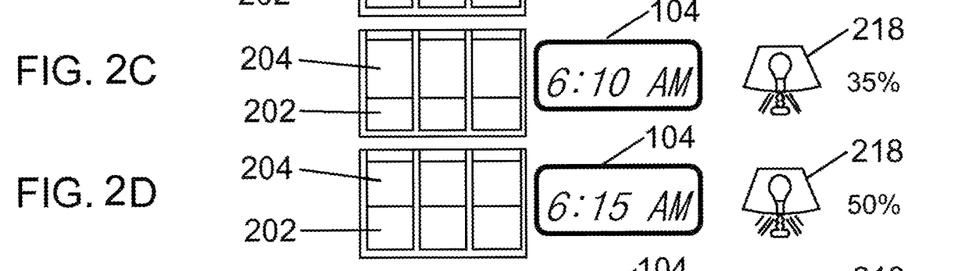
Figures 2E, 2F, 2G:
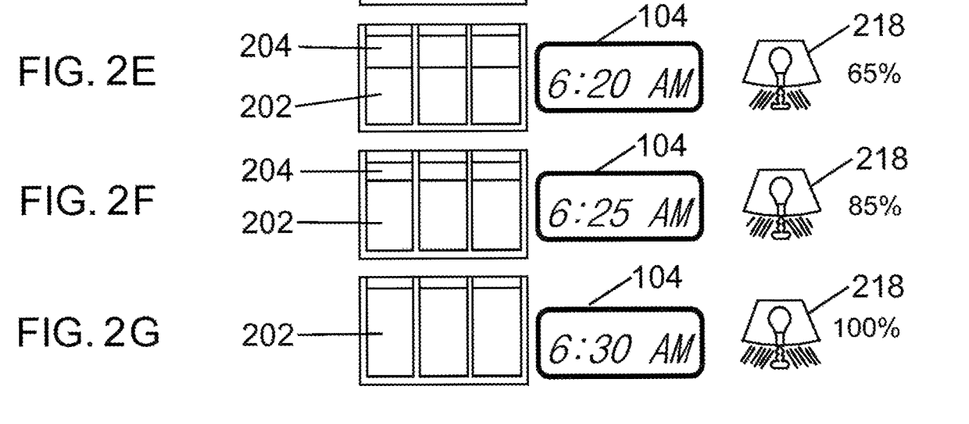

FIG. 2 shows a non-limiting example of a simulated sunrise event. In FIG. 2, the user has input an alarm time of 6:30 AM. It will be understood that the alarm time, the time at which the sunrise event begins, the number of shade movements in the sunrise event, and the length of each interval can be varied and in some embodiments are selected by user inputs.

In FIG. 2, up until the shade command is issued, the shade 204 is in the fully closed position. In this example the window shade alarm 100 is configured or programmed by a user input value to perform a simulated sunrise event beginning one half hour before the alarm time. In some embodiments, the shade positioning command sequence is a single command to continuously move the motorized shade mechanism such that the shade opens at an average speed to a fully open position within one half hour before the alarm time; in other words the gradual opening begins at 6:00 AM. FIG. 2 shows the state of the shade and window at various times in the half hour period. In some embodiments, if activated by the user, the processor of the window shade alarm issues commands to wirelessly connected lights to gradually increase the brightness of the connected lights. These commands can either cause continuous gradual increase, or stepwise increase in illumination throughout the period of the sunrise event.

In other embodiments, the window shade alarm 100 performs a simulated sunrise event by issuing a plurality of shade positioning commands to move the shade to discrete positions at discrete times. The plurality of shade positions can be determined as a percentage of the shade length, which opens at the end of a specific time interval for each discrete position. If no time interval is chosen by the user, a default time is used as the time interval (e. g. 15 minutes) In other embodiments the opening range can be determined by length to open at each position (e. g. 2 inches).

In some embodiments the opening of the shade and the increase in the brightness of the wirelessly connected light are synced, such that for each discrete shade position there is a corresponding increase in the brightness of the wirelessly connected light. In other embodiments, the shade is opened continuously while the wirelessly connected light increases the brightness in discrete steps. In other embodiments, the wirelessly connected light increases continuously in brightness while the shade opens in discrete steps.

Figure 3:
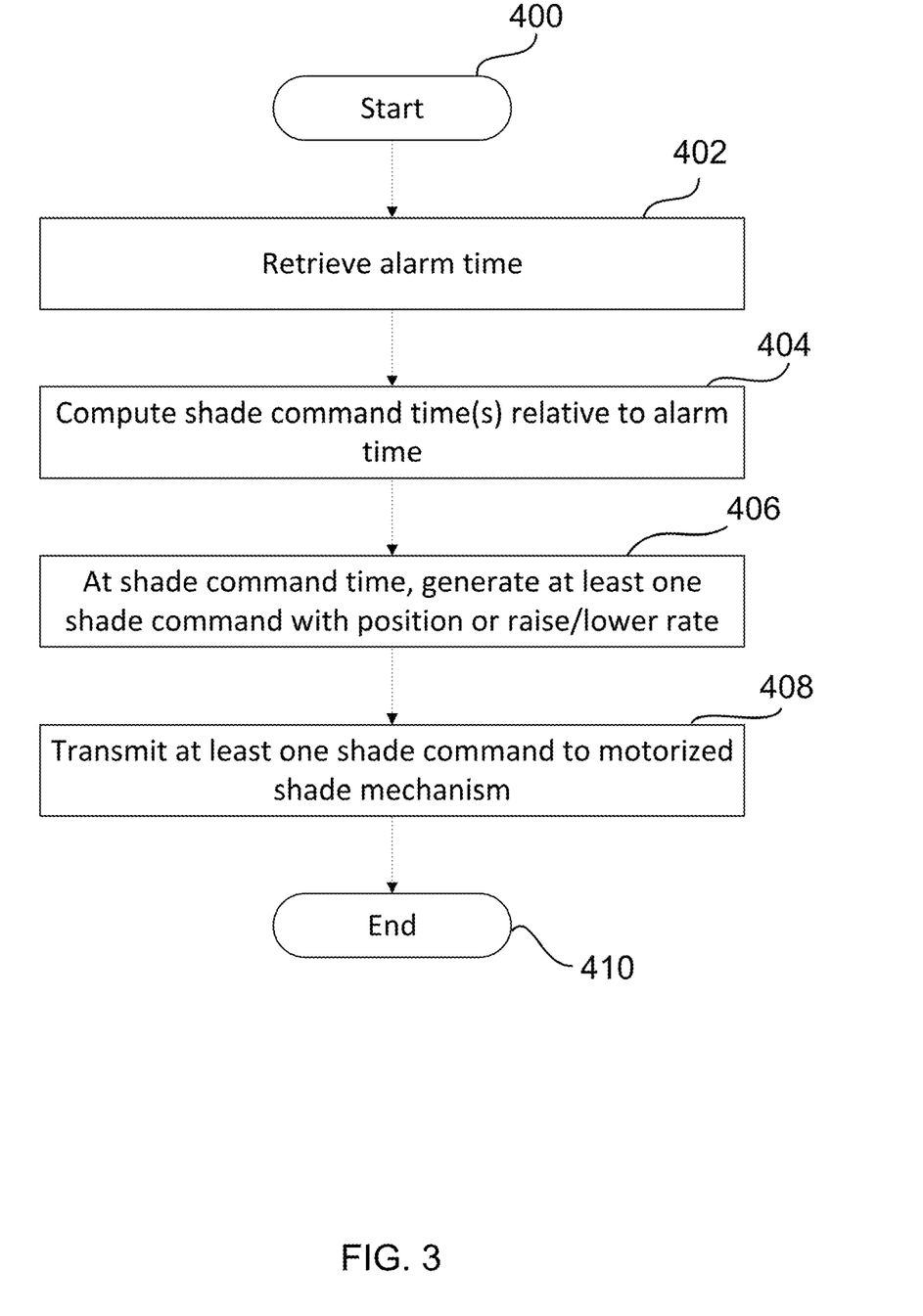
FIG. 3 depicts a flow chart of a method performed by the window shade alarm of FIG. 1.

FIG. 3 is a flow chart of the operation of an embodiment of a window shade alarm 100 under the control of a processor.

At step 400, the sequence starts. A sunrise event is initiated.

At step 402, the processor 102 retrieves the alarm time from the non-transitory storage medium 103.

At step 404 the processor 102 computes at least one shade command time relative to the alarm time. For example, in some embodiments, a single shade command time at a default interval (e. g. 10 or 15 minutes) before the alarm time is selected. In other embodiments the user inputs the interval and/or number of steps used to gradually increase the shade opening.

At step 406, at each shade command time the processor 102 generates at least one shade command to be transmitted to the motorized shade mechanism, identifying a shade motor movement (corresponding to a position of the bottom of the shade) or a shade motor rate (corresponding to a rate of raising the shade).

Figure 4:
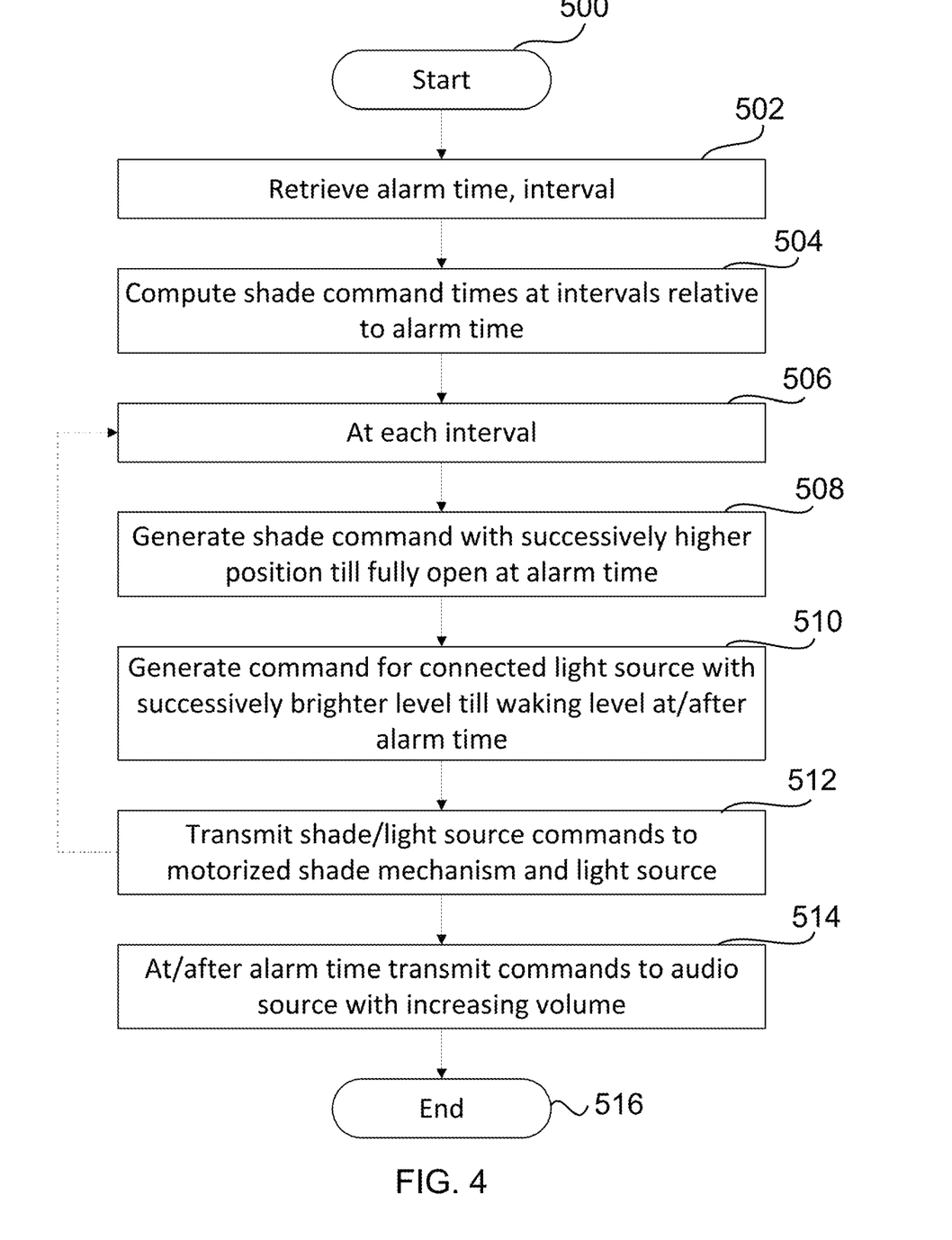
FIG. 4 depicts a flow chart of a method performed by the window shade alarm of FIG. 1.

FIG. 4 is a more detailed flow chart showing operation according to certain embodiments. Thus FIG. 4 is an example, and does not limit the range of embodiments encompassed by FIG. 3.

At step 500 the sequence starts. A sunrise event is initiated by choosing the sunrise event. In the example of FIG. 4 the lighting command is also activated.

At step 502, the processor retrieves the alarm time from the non-transitory storage medium. The alarm time and the length of the interval between initiation of shade movements, and/or number of shade movements is input by the user as described above.

In some embodiments the system only uses one interval, and the user inputs the length for the sunrise event. In the example of FIG. 4. The user inputs both the interval length and the number of intervals.

At step 506, the processor 102 computes one or more shade command times relative to the alarm time.

At step 508, a loop is performed for each interval, beginning at a time, which precedes the alarm time by the product of the interval length and the number of intervals.

At Step 510, at each of the one or more shade command times, the processor 102 generates a shade command to be transmitted to the motorized shade mechanism for causing the shade to be raised, At step 512, at each of the one or more shade command times, the processor 102 generates a shade command to be transmitted to the wirelessly connected light for causing light levels to be increased. In some embodiments the commands to increase the brightness of the wirelessly connected light are transmitted from the processor 102. In some embodiments the commands to increase the brightness of the wirelessly connected light are transmitted immediately before or after the shade commands. In other embodiments the commands to the wirelessly connected light are not synchronized with the shade commands.

At step 514, the window shade alarm transmits the shade commands to the motorized shade mechanism, and the light commands to the wirelessly connected light.

At step 516, commands are transmitted to a wirelessly connected audio source, causing an audible alarm to sound.

At step 528, the sequence ends.

Figure 5:
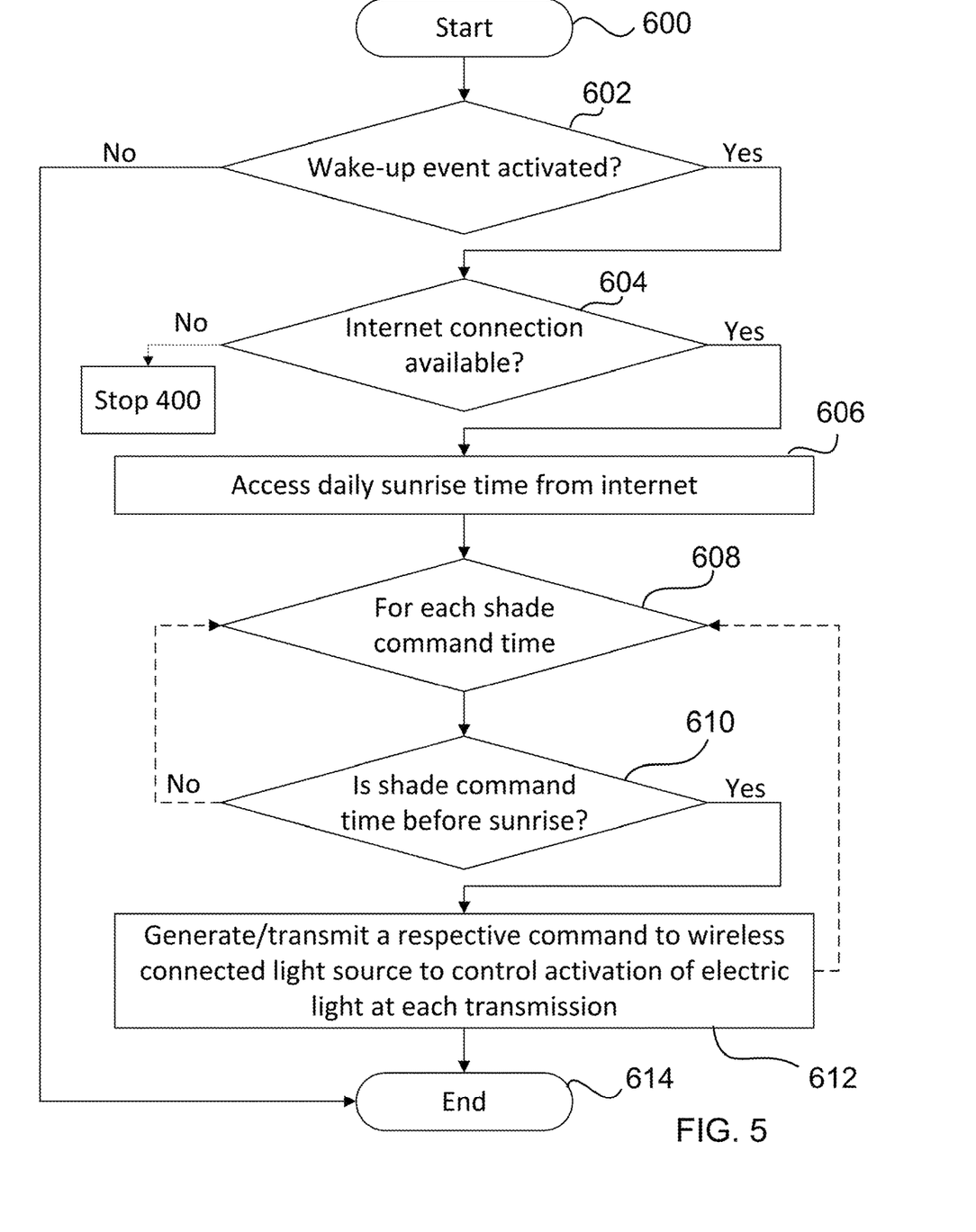
FIG. 5 depicts a flow chart of a method performed by the window shade alarm of FIG. 1.

FIG. 5 is a flow chart showing the operation of the window shade alarm, which interfaces with the Internet.

At step 600 the operation begins.

At step 601, a determination is made whether the wake-up event (sunrise event) has been activated.

If there is no wake-up event activated the sequence ends.

At step 602, if a wake-up event has been activated, a determination is made whether the window shade alarm is connected to the Internet. If the window shade alarm is not connected to the internet then the window shade alarm reverts to step 400, FIG. 3.

At step 604, if the window shade alarm is connected to the Internet, the window shade alarm will access the daily sunrise time from the Internet. There are various websites and apps that determine the daily sunrise time for a particular location, one skilled in the art will easily be able to perceive the ability to connect the sunrise time via the internet to the window shade alarm. The wireless enabled device may be activated through a cloud based network.

At step 606, the window shade alarm determines the following for each command time.

At step 608, the window shade determines if the shade command time is prior to the local sunrise. If the shade command time is not prior to the local sunrise, as determined by the query to the Internet, the sequence follows the normal sunrise event sequence of FIG. 3.

At step 610, if the shade command time is prior to the local sunrise time, the processor 102 will generate and transmit a command to a wirelessly connected light to increase the brightness of the light at each shade time.

At step 612, the sequence ends.

Figure 6:
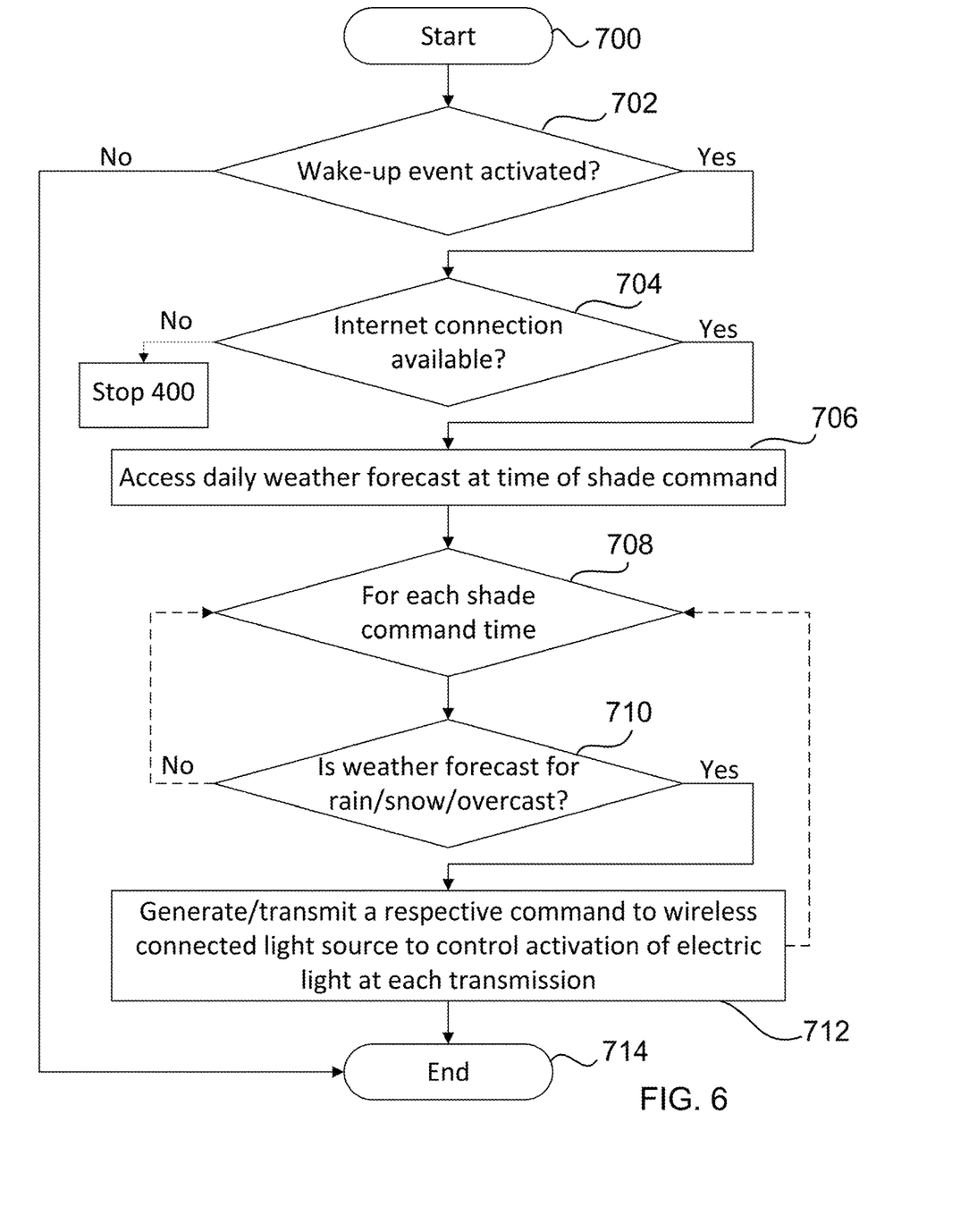
FIG. 6 a flow chart of a method performed by the window shade alarm of FIG. 1 according to one embodiment.

FIG. 6 is a flow chart showing the operation of the window shade alarm, which interfaces with the Internet.

At step 700 the operation begins.

At step 701, a determination is made whether the wake-up event (sunrise event) has been activated.

If there is no wake-up event activated the sequence ends.

At step 702, if a wake-up event has been activated, a determination is made whether the window shade alarm is connected to the Internet. If the window shade alarm is not connected to the internet then the window shade alarm reverts to step 400, FIG. 3.

At step 704, if the window shade alarm is connected to the Internet, the window shade alarm will access the daily weather forecast at the alarm time from the Internet. (There are various websites and apps that determine the daily forecast for a particular location, one skilled in the art will easily be able to perceive the ability to connect the sunrise time via the internet to the window shade alarm)

At step 706, the window shade alarm determines the following for each command time.

At step 708, the window shade determines if the weather will obscure the sun at the shade command time. If the weather forecast determines that the sun will not be obscured at the shade command time, as determined by the query to the Internet, the sequence follows the normal sunrise event sequence of FIG. 3.

At step 710, if the processor determines that the weather will obscure the sun at the shade command time, the processor 102 will generate and transmit a command to a wirelessly connected light to increase the brightness of the light at each shade time.

At step 712, the sequence ends.

In some embodiments a user may choose to have an audible alarm sound. For example in some embodiments if the user does not turn off the window shade alarm following the completion of the sequence of FIG. 3, or the sequence of FIG. 5, or the sequence of FIG. 6, the processor 102 will cause generate a command that will cause the wireless antenna 105 to transmit an activation command to a wirelessly enabled speaker. The speaker will sound an audible alarm till the alarm is turned off.

Figure 7:
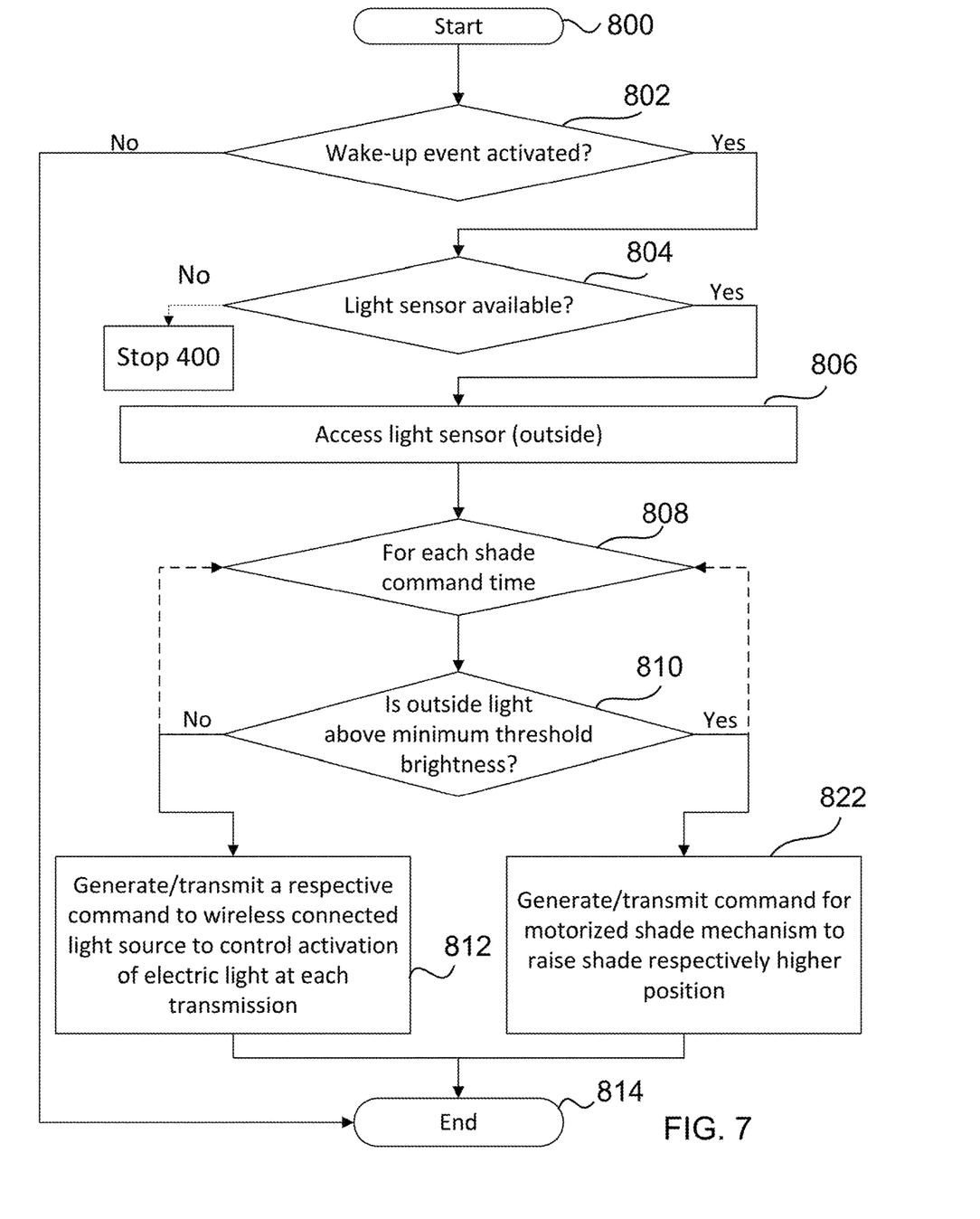
FIG. 7 depicts a flow chart of a method performed by the window shade alarm of FIG. 1 according to one embodiment.

FIG. 7 is a flow chart showing the operation of the window shade alarm, which is connected to a light sensor positioned to monitor the light outside the window where the window shade alarm is located.

At step 800 the operation begins.

At step 801, a determination is made whether the wake-up event (sunrise event) has been activated.

If there is no wake-up event activated the sequence ends.

At step 802, if a wake-up event has been activated, a determination is made whether the window shade alarm is connected to a light sensor. If the window shade alarm is not connected to a light sensor then the window shade alarm reverts to step 400, FIG. 3.

At step 804, if the window shade alarm is connected to a light sensor.

At step 806, the window shade alarm determines the following for each command time.

At step 808, the window shade determines if the outside is above a minimum threshold value at the shade command time.

At step 820, if the light outside is above a threshold level at the shade command time, the sequence follows the normal sunrise event sequence of FIG. 3.

At step 810, if the light outside is not above a minimum threshold level at the shade command time, the processor 102 will generate a command and cause the wireless antenna 105 to transmit a command to a wirelessly connected light to increase the brightness of the light at each shade time.

At step 822, the sequence ends.

The shade contains a wireless antennae (which operates via one of; wireless network, Bluetooth, a proprietary radio frequency (RF) or other wireless technology). Also housed in the window shade is a processor connected non-transitory memory, which contains data sequences for the opening and closing of the blinds.

The non-transitory memory contains preprogrammed wake-up sequences. Additionally the user my program their own wake-up sequence for waking them up.

The processor is connected to and controls the motorized shade mechanism. When a user selects a wake-up sequence the processor follows the chosen sequence to open the shade according to the predetermined intervals related to the alarm time.

In some embodiments the wireless enabled device is a cellular phone, thus when the window shade sends a signal the phone will increase the light output from its screen or the phone will sound an audible alarm.

In some embodiments the wireless enabled device will be a lamp or other lighting device within a room, thus when the processor of the window shade causes a signal to be sent from the wireless antennae of the window shade the lighting device will increase the light output according to the predetermined wake-up sequence. In some embodiments the wireless enabled device will be an appliance such as a television, thus when the processor of the window shade causes a signal to be sent from the wireless antennae of the window shade to the television, the television will increase the light output according to the predetermined wake-up sequence.

In some embodiments the wireless enabled device will be an appliance such as a fan or heater, thus when the processor of the window shade causes a signal to be sent from the wireless antennae of the window shade the heater or fan will turn on. In some embodiments the wireless enabled device will be a security system, microwave, coffeemaker or toaster, thus when the processor of the window shade causes a signal to be sent from the wireless antennae of the window shade the toaster, coffeemaker, or microwave will turn on.

In some embodiments the wireless enabled device will be automated blinds, thus when the processor of the window shade causes a signal to be sent from the wireless antennae of the window shade the automated blinds will raise thus increasing the light output according to the predetermined wake-up sequence.

In some embodiments the wireless enabled device will sound an audible alarm, thus when the processor of the window shade causes a signal to be sent from the wireless antennae of the window shade a device capable of sounding an audible alarm, will sound an audible alarm. The wireless enabled device that can sound an audible alarm can be any appliance such as a security system, radio, television, coffeemaker, toaster, microwave, dishwasher, washer or dryer.

In some embodiments a battery powers the window shade alarm. In some embodiments this battery is charged via a photovoltaic module.

In some embodiments the window shade housing includes a light sensor directed outside. When the light sensor determines that the light outside is below a certain threshold the light sensor will cause the processor to send a signal via the wireless antennae to the wireless enabled devices causing them to increase the light output or to sound an audible alarm.

In one embodiment the predetermined wake-up sequence is; 30 minutes before alarm time the motorized window shade mechanism opens the window shade 25%, 23.5 minutes before alarm time the window shade mechanism opens the shade to 50% open, 15 minutes before the alarm time the window shade mechanism opens the shade to 75% open, 7.5 minutes before alarm time the window shade mechanism opens the shade to 100% open.

In another embodiment the predetermined wake up sequence is: 27 minutes before alarm time the motorized window shade mechanism opens the shade to 10% open, 24 minutes before alarm time the motorized window shade mechanism opens the shade to 20% open, 21 minutes before alarm time the motorized window shade mechanism opens the shade to 30% open, 18 minutes before alarm time the motorized window shade mechanism opens the shade to 40% open, 15 minutes before alarm time the motorized window shade mechanism opens the shade to 50% open, 12 minutes before alarm time the motorized window shade mechanism opens the shade to 60% open, 9 minutes before alarm time the motorized window shade mechanism opens the shade to 70% open, 6 minutes before alarm time the motorized window shade mechanism opens the shade to 80% open, 3 minutes before alarm time the motorized window shade mechanism opens the shade to 90% open, at alarm time the motorized window shade mechanism opens the shade to 10% open.

In some embodiments, the at least one shade positioning command includes a single command to cause the shade to gradually open at a predetermined average rate. For example when the alarm is set, the motorized shade mechanism can cause the shade to open at a predetermined speed for a predetermined period of time, until in the fully open position. The processor can use a user input time, or a default period stored in a non-transitory storage medium within the window shade. If, the period of time is input by the user, the shade positioning command includes the period of time and the average speed. The processor, attached to the motorized shade mechanism is capable of computing the speed of the shade.

The methods and system described herein may be at least partially embodied in the form of computer-implemented processes and apparatus for practicing those processes. The disclosed methods may also be at least partially embodied in the form of tangible, non-transient machine-readable storage media encoded with computer code. The media may include for example, hard disk drives, flash memories, or any other non-transient machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer code segments configure the processor to create specific logic circuits. The methods may alternatively be at least partially embodied in a digital signal processor formed of application specific integrated circuits for performing the methods.

Although the subject matter has been described in terms of exemplary embodiments, it is not limited thereto. Rather, the appended claims should be construed broadly, to include other variants and embodiments, which may be made by those skilled in the art.

We claim:

1. A window shade alarm comprising;
   a window shade housing comprising;
      a clock display located on and occupying a portion of a side of the housing facing into a room;
   a processor comprising alarm sequences for opening and closing a window shade; and
   a wireless antenna;
   an audio alarm in communication with the processor;
   a motorized shade mechanism in communication with the processor to move the window shade to one or more positions at one or more predetermined intervals relative to each alarm sequence, and
   wherein the wireless antenna is in communication with one or more remote wireless enabled devices for controlling ambient conditions;
   wherein, the processor causes the motorized shade mechanism to open the window shade at predetermined intervals until the shade is fully open;
   wherein the wireless antenna transmits a signal to a wireless enabled device to increase a light output by the wireless enabled device at specific intervals relative to the alarm sequences.

2. The window shade of claim 1 wherein, the wireless enabled device is an appliance selected from the group consisting of an appliance light, radio, television, heater, fan, automated blinds, coffeemaker, toaster, microwave.

3. The window shade of claim 1 wherein, the wireless enabled device is a mobile phone.

4. The window shade of claim 1 wherein the wireless antenna transmits a signal to wireless enabled device to sound an audible alarm at specific intervals relative to each alarm sequence.

5. The window shade of claim 4 wherein, the wireless enabled device is a speaker.

6. The window shade of claim 4 wherein, the wireless enabled device is a mobile phone.

7. The window shade of claim 4 wherein, the wireless enabled device is a speaker housed in a bed frame.

8. The window shade alarm of claim 1, wherein the wireless enabled device is a security system.

9. The window shade alarm of claim 1, wherein the wireless enabled device is activated through a cloud based network.

10. A window shade alarm comprising;
a window shade housing comprising;
a clock display located on and occupying a portion of a side of the housing facing into a room;
a processor comprising alarm sequences for opening and closing a window shade; and
a wireless antenna;
an audio alarm in communication with the processor;
a motorized shade mechanism in communication with the processor to move the window shade to one or more positions at one or more predetermined intervals relative to each alarm sequence, and
wherein the wireless antenna is in communication with one or more remote wireless enabled devices;
wherein the processor causes the motorized shade mechanism to open the window shade at a predetermined speed until the shade is fully open;
wherein the wireless antenna transmits a signal to the one or more wireless enabled device to increase the light output by the one or more wireless enabled devices at specific intervals that correspond to the alarm sequences.

11. The window shade of claim 10, wherein the wireless enabled device is a mobile phone.

12. The window shade of claim 10, wherein the wireless enabled device is an appliance selected from the group consisting of; television, radio, heater, fan, coffeemaker, toaster, microwave.

13. A window shade alarm comprising;
a window shade housing comprising;
a clock display located on and occupying a portion of a side of the housing facing into a room;
a processor within the housing for generating and communicating at least one shade positioning command to a motorized shade mechanism to move a window shade to one or more positions at one or more predetermined intervals alarm time;
a non-transitory storage medium for storing alarm sequences;
a wireless antenna, that connects to the Internet to determine a sunrise time at a geographic location of the window shade
wherein the processor causes the motorized shade mechanism to open the window shade, and the processor causes a command to be sent from the wireless antenna to a wireless enabled device causing the device to increase a light output by the wireless enabled device.

14. The window shade alarm of claim 13, wherein processor causes the motorized shade mechanism to open the window shade at a time that is after a local sunrise time.

15. The window shade alarm of claim 13, wherein, the wireless enabled device is a mobile phone.

16. The window shade alarm of claim 13, wherein the wireless enabled device is a light.

\* \* \* \* \*